E. P. PORCHER.
AUTOMOBILE TOP ACTUATING MECHANISM.
APPLICATION FILED OCT. 28, 1914.
1,173,858. Patented Feb. 29, 1916.
5 SHEETS—SHEET 2.
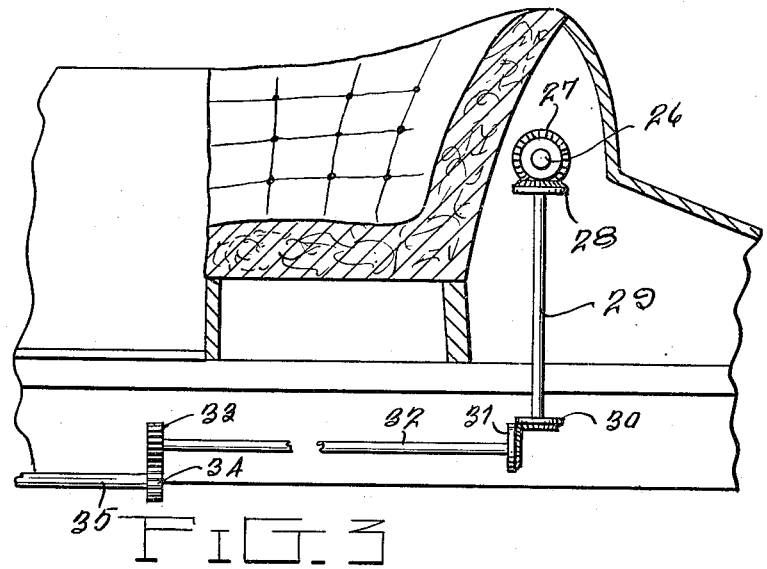
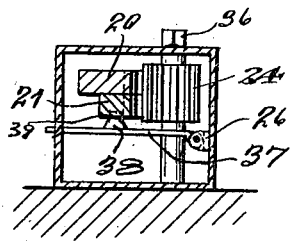
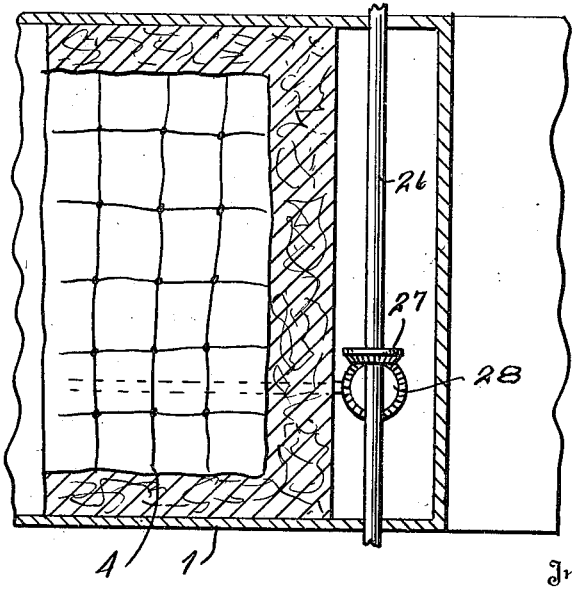

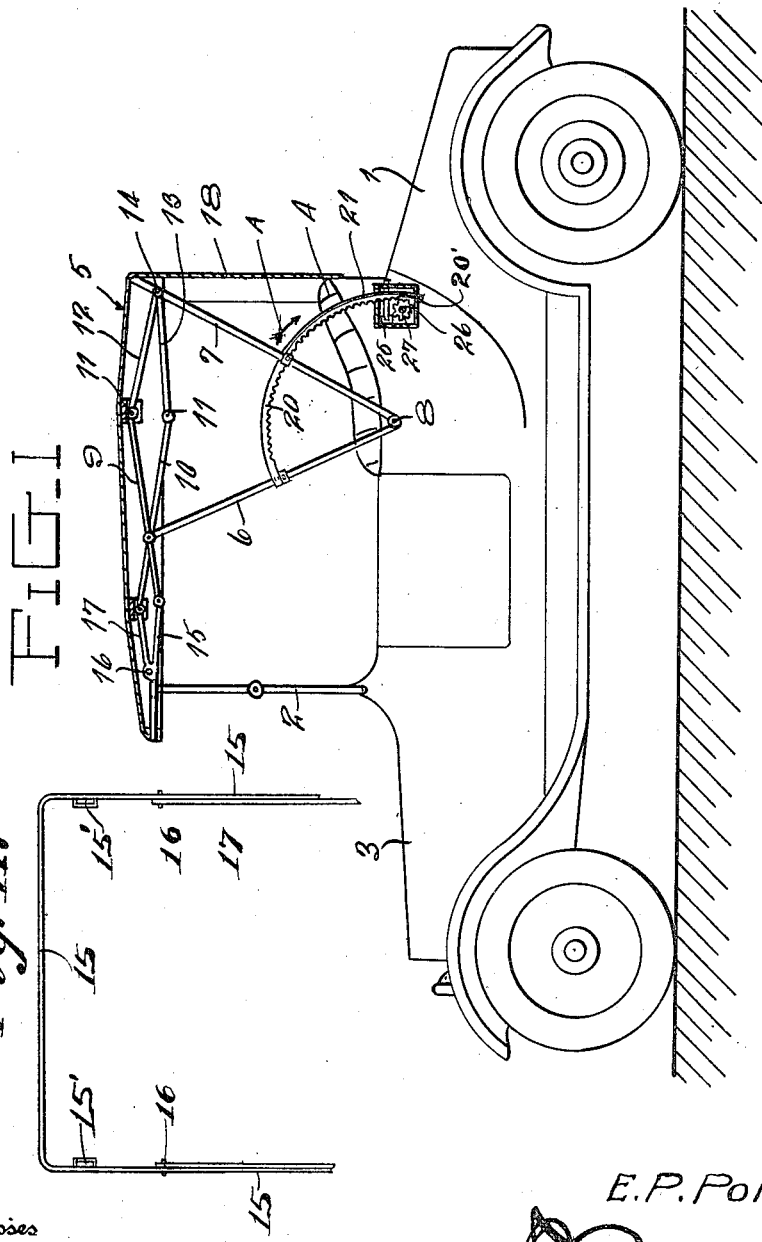

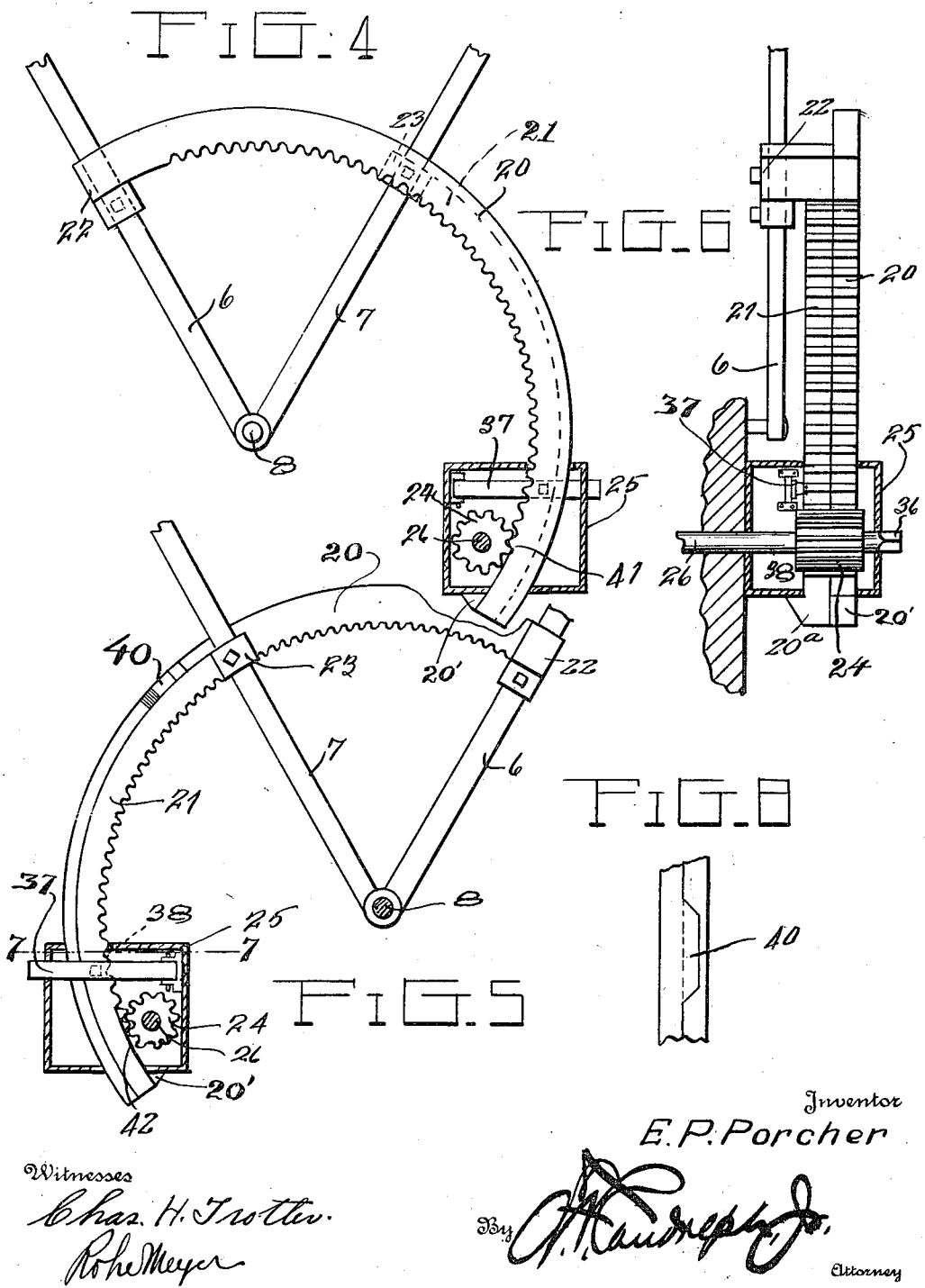

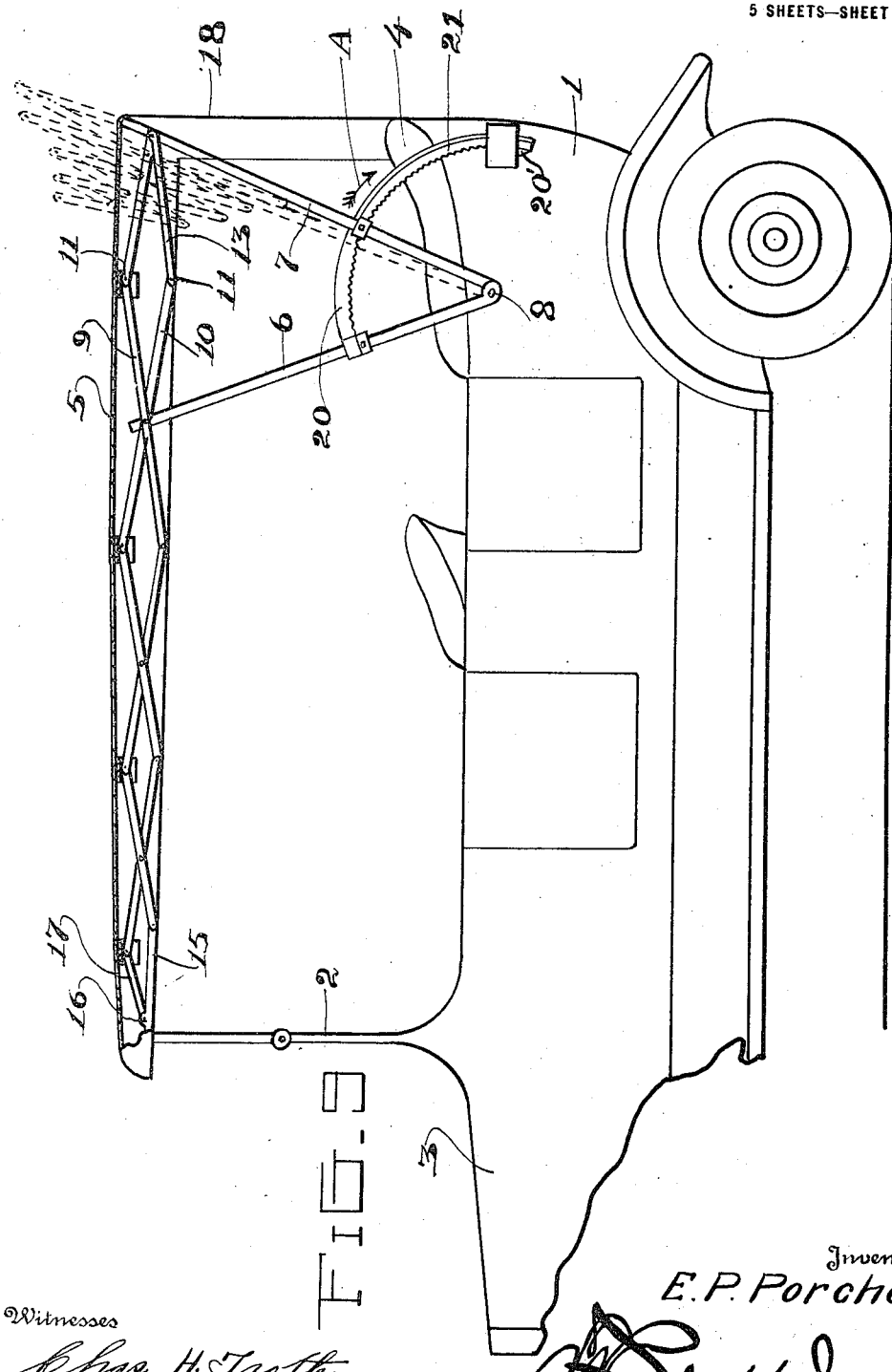

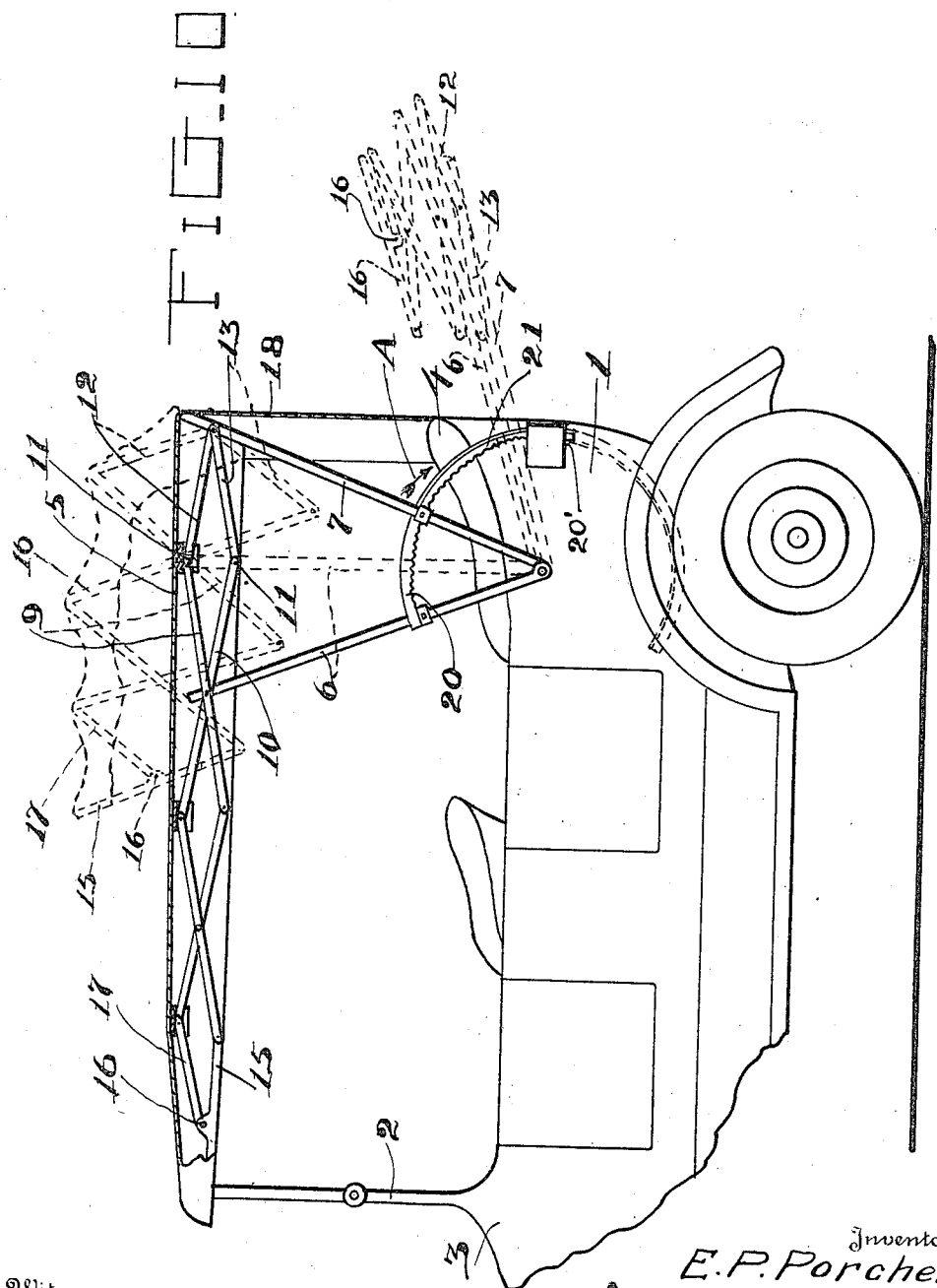

UNITED STATES PATENT OFFICE.

EDWARD P. PORCHER, OF CHARLESTON, SOUTH CAROLINA.

AUTOMOBILE-TOP-ACTUATING MECHANISM.

1,173,858.  Specification of Letters Patent.  Patented Feb. 29, 1916.

Application filed October 28, 1914.  Serial No. 869,087.

*To all whom it may concern:*

Be it known that I, EDWARD P. PORCHER, a citizen of the United States, residing at Charleston, in the county of Charleston and State of South Carolina, have invented certain new and useful Improvements in Automobile-Top-Actuating Mechanisms; and I do hereby declare the following to be a full, clear, and exact description of the invention, such as will enable others skilled in the art to which it appertains to make and use the same.

This invention relates to a mechanism for raising or lowering automobile tops, and the primary object of the invention is the provision of a mechanism as specified which is operable by the propelling power of the automobile or other motor vehicle, so that the operator may raise or lower the top of the motor vehicle without leaving the seat of the same.

Another object of this invention is the provision of a plurality of racks which are positioned alongside of each other for acting upon various stays or standards of the automobile top for properly folding or unfolding the top to insure the efficient raising or lowering of the same.

With the foregoing and other objects in view, this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which, Figure 1 is a side elevation of an automobile showing the improved top raising and lowering mechanism applied thereto, Fig. 2 is a fragmentary view in section through the automobile body showing the part of the mechanism for raising and lowering the top, Fig. 3 is a plan view of Fig. 2, Fig. 4 is a side elevation of the arcuate rack bars for raising or lowering the top, Fig. 5 is a side elevation of the rack bars showing the side opposite to the one exhibited in Fig. 4, Fig. 6 is an edge view of the rack bars, Fig. 7 is a sectional view on the line 7—7 of Fig. 5, Fig. 8 is a detail fragmentary view of a part of the rack bars used for raising or lowering curtains of the top of the automobile, Fig. 9 is a fragmentary view in side elevation of an automobile showing the improved top construction applied thereto, and in section, and showing the top in a folded position in dotted line, Fig. 10 is a view similar to Fig. 9 showing the top in a semi-folded position in dash lines and showing the top in dotted lines, folded and lying behind the body of the car, and Fig. 11 is a fragmentary bottom plan view of the forward end of the top supporting frame showing the manner of attaching the frame to the wind shield of an automobile.

Referring more particularly to the drawings, 1 designates the body of an automobile which is shown in the drawings as a runabout, but it should be understood that the invention may be applied to a touring car or any other suitable type of vehicle or motor vehicle which has a foldable top. The body 1 of the automobile has a wind shield 2 of the ordinary construction secured to the front end of the same rearwardly of the hood 3, and it has a seat or plurality of seats, according to the type of vehicle. The top 5 of the automobile is supported by standards 6 and 7, which are pivoted at 8 to the sides of the vehicle or automobile body 1.

The standards 6 have rods 9 and 10 pivotally connected to their upper ends, which rods are arranged for crossing each other as is clearly shown in Fig. 1 of the drawings, and they have pivotally or hingedly connected at 11, or to their ends, rods 12 and 13. The rods 12 and 13 are in turn hingedly connected at 14 to the rear standard 7. The rod 9 has a rod 15 hingedly connected to its forward end, which rod has a bar formed thereupon to which is hingedly connected the rod 17. The rod 17 is also hingedly connected to the end of the rod 10 so that the various rods 15, 17, 9, 10, 12 and 13 may be folded for collapsing the top 5 of the vehicle for causing it to assume a folded position as indicated in dotted lines in Fig. 9 of the drawings. The rod 15 which is substantially U-shaped, is provided with sockets 15' for receiving the upper end of the rod of an automobile wind shield for attaching the forward end of the top to the shield and supporting the top. The rods heretofore mentioned have the ordinary type of fabric cover 18 secured thereto which forms a top or roof and back for the automobile when the top is in an open position as shown in Figs. 1 and 10.

The standards 6 and 7, which are positioned upon one side of the vehicle body 1, have rack bars 20 and 21 attached thereto. The standard 6 has the arcuate rack bar 20 secured thereto by means of a collar 22 which is formed upon one end of the rack bar, while the standard 7 has the rack bar 21 secured thereto by a collar 23 which is formed upon one end of the rack bar. The rack bar 21 is much shorter than the rack bar 20 as is clearly shown in Fig. 5 of the drawings, so that the standards 6 and 7 will be moved in the proper proportion in relation to each other for properly raising the top 5.

The arcuate rack bars have rack teeth formed upon their inner concave sides, which teeth mesh with a pinion 24. The pinion 24 is positioned within a casing 25 which is secured to the side of the seat 4 near the rear end of the same, and it is mounted upon a shaft 26. The shaft 26 extends transversely across the body 1 of the automobile and has a beveled gear 27 mounted thereon intermediate of its ends. The beveled gear 27 meshes with a second beveled gear 28, which is mounted upon a vertical shaft 29. The vertical shaft 29 is supported in any suitable manner within the body 1 of the automobile and it has a beveled gear 30 mounted upon its lower end. The beveled gear 30 meshes with the beveled gear 31 which is mounted upon a shaft 32. The shaft 32 is positioned horizontally within the body 1 of the vehicle and it extends forwardly therein, having a gear 33 mounted upon the forward end. The gear 33 meshes with the second gear 34 which is positioned directly beneath the gear 33 and faces in the opposite direction. The gear 34 is mounted upon a slidable shaft 35, which shaft is connected to a clutch lever (not shown), for shifting rearwardly so that it will move into or out of meshing engagement with the gear 33. The shaft 35 is operatively connected to the prime mover of the automobile (not shown), so that when it is moved for causing the gears 33 and 34 to mesh, the various shafts and gears will be rotated for rotating the shaft 26. The shaft 26 has a square or rectangular end 36 formed thereupon which protrudes out of the casing 25 and is provided for attaching a crank handle (not shown) to the shaft for rotating the shaft when the prime mover of the vehicle is not in operation.

For insuring the proper movement of the arcuate racks 20 and 21, so that the rack 20 will move a certain distance before any movement is imparted to the rack 21, for folding the standard 6 in alinement with the standard 7 prior to the movement of the latter standard, a flat spring 37 is provided which has a lug 38 formed thereupon. The lug 38 is normally seated in an opening 39 which is formed in one side of the rack 21. The lug 38 holds the rack 21 against movement until the releasing lug 40, which is carried by the rack 20 moves into engagement with the under surface of the spring 37 and forces it outwardly by moving the lug 38 out of the recess 39. The rack bar 20 has a lug 20' formed upon its lower end for engagement with the under surface of the casing 25 for preventing the rack bar from moving upwardly through the casing.

The rack bar 21 also has a lug 20ª formed upon its lower end which serves a purpose identical with the function performed by the lug 20' formed upon the rack bar 20 and also serves to take the strain off the fabric cover 18 and to hold the standard 7 in place when the top is being opened.

In Figs. 9 and 10 of the drawings, the top of the automobile is shown in various folded positions, and in dotted and dash lines, which positions are shown during the folding of the top and the actuation of the rack bars for laying the top behind the automobile body as is indicated in dotted lines at 50 in Fig. 10 of the drawings.

In the operation of the improved vehicle top operating mechanism: when the top is in a raised position and it is desired to lower or fold the same, the forward end is disconnected from the wind shield 2 and a slight push is administered to the top which moves the top to the position shown in dotted and dash lines in Fig. 10 of the drawings and moves the rack bar 20 so that the teeth thereof will move into meshing engagement with the teeth of the pinion 24. The rack bars 20 and 21 have the inner surface at their terminals smooth as is clearly shown at 41 and 42 in Figs. 4 and 5 of the drawings. After the rack bars have been moved so that the teeth thereof will engage the pinion 24, the shaft 26 and the pinion 24 is rotated through the operation of the shaft 35 in the manner hereinbefore described. By the provision of the flat spring 37 and the lug 38, the arcuate rack 21 is held against movement until the rack 20 has moved sufficient distance to cause the lug 40 carried thereby to move under the end of the spring 37 and force the lug 38 out of the recess 39, which releases the rack bar 21 and causes it to move synchronously with the rack bar 20 for lowering the top of the curtain, which occurs after the standard 6 has approached the standard 7, and the same are completely folded side by side, the action of the rack bars moving to lay the top down after it is folded, behind the car. The lug 40 is positioned upon the rack bar 20 so that it will not operate the spring 37 until the standard 6 is moved in alinement with the standard 7, causing the two standards to move synchronously with each other after the spring has been operated.

When the top is in a lowered position and it is desired to raise the same, the pinion 24 is rotated through the operation of the shaft 35 in the manner described before, the pinion 24 meshing with the arcuate rack bars 20 and 21 move them together until the pinion 24 runs off of the toothed portion of the rack bar 21, onto the smooth inner surface 42 of the terminal of said rack bar, thereby as the standards 6 and 7 are secured to the rack bars both will move together until the toothed portion of the rack bar 21 is disengaged from the pinion.

From the foregoing description taken in connection with the accompanying drawings the advantages of the construction and of the method of operation of the improved automobile top actuating mechanism will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions, provided such alterations are comprehended within the scope of what is claimed.

What is claimed is:

1. The combination with a motor vehicle including mechanism to be operated by a prime mover, a body, a foldable top, and a plurality of pivotally supported standards connected to said top, of a plurality of rack bars connected to said top supporting standards, a section of said rack bars being of greater length than other of said rack bars, and means operatively connecting the long and short rack bars to said mechanism for moving said rack bars for raising or lowering said top.

2. The combination with a motor vehicle including mechanism adapted to be operated by a prime mover, a body, a foldable top, and pivoted standards for supporting said top, of a plurality of rack bars connected to said top supporting standards, certain of said rack bars being of greater length than other of said rack bars, for insuring the proper folding or unfolding movement of said top, and means for restraining said short rack bars from downward movement until the standards to which said long rack bars are connected are in alinement with the standards to which said short rack bars are connected, and means operatively connecting said rack bars to said mechanism.

3. The combination with a motor vehicle having a body, mechanism adapted to be operated by a prime mover, a top, and pivoted standards for supporting said top, of a plurality of arcuate rack bars connected to said standards, certain of said rack bars being of greater length than other of said rack bars, said long rack bars being connected to the foremost of said top-supporting standards, said short rack bars being connected to the rearmost of said standards, pinions meshing with said rack bars, said short rack bars being provided with recesses, springs, lugs carried by said springs for seating in said recesses for restraining movement of said short rack bars, and means carried by said long rack bars for operating said spring for releasing said short rack bars for movement.

4. The combination with a motor vehicle having a body, mechanism adapted to be operated by a prime mover, a top, and pivoted standards for supporting said top, of a plurality of arcuate rack bars connected to said standards, certain of said rack bars being of greater length than other of said rack bars, said long rack bars being connected to the foremost of said top-supporting standards, said short rack bars being connected to the rearmost of said standards, pinions meshing with said rack bars, said short rack bars being provided with recesses, springs, lugs carried by said springs for seating in said recesses for restraining movement of said short rack bars, means carried by said long rack bars for operating said springs for releasing said short rack bars for movement, and a plurality of shafts and gears operatively connected to said pinion and said mechanism for operating said rack bars by movement of said mechanism.

In testimony whereof I affix my signature in presence of two witnesses.

EDWARD P. PORCHER.

Witnesses:
  W. C. De Lorne,
  R. V. Royall, Jr.